Patented Sept. 14, 1926.

1,599,963

UNITED STATES PATENT OFFICE.

THOMAS S. HAMILTON, OF LOS ANGELES, CALIFORNIA.

LUBRICATING COMPOUND.

No Drawing.     Application filed August 8, 1925. Serial No. 49,131.

This invention relates to lubricating compounds and more particularly to a composition adapted to produce a lubricant in a semisolid condition.

This application is a continuation in part of my copending application on lubricating compounds filed December 3, 1923, Serial No. 678,354.

An object of the present invention is the provision of a lubricant in the form of a paste which may be placed in position and which dries hard, sticking to the surface to be lubricated.

A further object is the provision of a lubricant which may be readily applied and which will remain in place.

A still further object is the provision of a dry lubricant that is not sticky and will, therefore, not collect particles of dust and grit, such as will be collected by oil when placed on exposed surfaces.

The invention comprises a lubricating compound formed of a mixture of a cellulose ester or like substance and graphite or other hard lubricant, the cellulose ester and graphite being intimately mixed to form a homogeneous mass. The materials may be mixed in various proportions, the nature of the compound being determined by the weight and consistency of the cellulose constituent.

The compound produced may be employed for lubricating leaf springs, frictional surfaces, abutting joints, and other articles in which a solid or semisolid lubricant is employed.

In the present invention I provide a lubricant which is substantially solid but which will flow under ordinary conditions under a slight pressure. The relative degree of hardness of the compound may be regulated by slight changes in the proportions of the ingredients and these proportions may be varied without departing from the present invention. In the prefered form of the invention I employ six pounds of the cellulose ester to one pound of graphite, the graphite being thoroughly incorporated in the cellulose ester and the mixture worked to produce complete incorporation, the resulting compound being a homogeneous mixture of the cellulose ester and graphite in the proportions stated.

In preparing the cellulose ester I dissolve celluloid in a liquid or non-aqueous solvent such as acetone, amyl acetate, methyl acetate, methyl acetone, sulfuric ether, coal tar naphtha, benzol or alcohol. This solvent may be employed separately or mixed and may be employed in any desired proportion to form a solution of the cellulose ester.

Any solid lubricant may be employed in place of graphite such as soap stone, talc and the like.

When the compound is employed for the purpose of lubricating leaf springs where a heavy pressure is encountered I may employ finely divided metal, such as aluminum or zinc borings as an integral part of the composition. The metal tends to separate the leaves of the spring a desired distance to permit the lubricant to dry and harden in the cake.

Wood fibre or other compressible insert filling may also be added as a filler and to assist the solvent in leaving the compound when the compound is compressed between the leaves of the spring thereby shortening the drying period. When wood fibre is employed as a filling it gives additional strength to the cellulose.

The lubricant produced has many advantages. The cellulose ester gives sufficient body to the lubricant to increase its life beyond what would be obtained if graphite were employed alone. By forming the material in a paste or semisolid condition it may be readily handled and the hardness may be regulated depending upon the use to which the lubricant is to be put.

Although I have described the preferred embodiment of the invention in detail, it is to be understood that known chemical equivalents may be used in place of the materials set forth and that changes in the proportion of parts may be resorted to without departing from the spirit of the invention or the scope of the subjoined claims.

I claim:

1. A lubricating compound comprising a mixture of a cellulose ester and graphite in the proportion of substantially six pounds of the cellulose ester to one pound of graphite.

2. A lubricating compound comprising a mixture of a cellulose ester, graphite, and finely divided solid metal.

3. A lubricating compound comprising a mixture of a cellulose ester, graphite, finely divided solid metal and wood filler.

In testimony whereof I affix my signature.

THOMAS S. HAMILTON.